US010521682B1

(12) United States Patent
Jeon et al.

(10) Patent No.: US 10,521,682 B1
(45) Date of Patent: Dec. 31, 2019

(54) APPARATUS AND METHOD FOR CONTROLLING OBJECT DETECTION

(71) Applicants: Hyundai Motor Company, Seoul (KR); Kia Motors Corporation, Seoul (KR); IEE International Electronics & Engineering S.A., Echternach (LU)

(72) Inventors: Seul Ki Jeon, Suwon-si (KR); Eung Hwan Kim, Seoul (KR); Gyun Ha Kim, Incheon (KR); Hoon Hur, Seoul (KR); Oscar Gomez, Paris (FR); Peter Koch Larsen, Bereldange (LU)

(73) Assignees: Hyundai Motor Company, Seoul (KR); Kia Motors Corporation, Seoul (KR); IEE International Electronics & Engineering S.A., Echternach (LU)

( * ) Notice: Subject to any disclaimer, the term of this patent is extended or adjusted under 35 U.S.C. 154(b) by 0 days.

(21) Appl. No.: 16/209,620

(22) Filed: Dec. 4, 2018

(30) Foreign Application Priority Data

Nov. 14, 2018 (KR) .................. 10-2018-0140285

(51) Int. Cl.
| | |
|---|---|
| *G06K 9/00* | (2006.01) |
| *G08B 21/02* | (2006.01) |
| *B60Q 5/00* | (2006.01) |
| *B60Q 1/50* | (2006.01) |
| *G08B 21/22* | (2006.01) |

(52) U.S. Cl.
CPC .......... *G06K 9/00838* (2013.01); *B60Q 1/50* (2013.01); *B60Q 5/005* (2013.01); *G08B 21/028* (2013.01); *G08B 21/22* (2013.01)

(58) Field of Classification Search
None
See application file for complete search history.

(56) References Cited

U.S. PATENT DOCUMENTS

| | | | | |
|---|---|---|---|---|
| 6,922,147 | B1* | 7/2005 | Viksnins | B60N 2/002 340/573.1 |
| 9,836,069 | B1* | 12/2017 | Nelmes | G05B 15/02 |
| 10,102,729 | B1* | 10/2018 | Hill | G08B 21/24 |
| 10,115,029 | B1* | 10/2018 | Day | G06K 9/00832 |
| 2003/0098792 | A1* | 5/2003 | Edwards | B60N 2/002 340/573.1 |
| 2005/0038582 | A1* | 2/2005 | Arndt | B60H 1/008 701/31.4 |
| 2007/0013531 | A1* | 1/2007 | Hules | B60R 25/1004 340/584 |
| 2013/0249395 | A1* | 9/2013 | Hatakeyama | B60K 35/00 315/77 |

(Continued)

*Primary Examiner* — Fekadeselassie Girma
(74) *Attorney, Agent, or Firm* — Slater Matsil, LLP

(57) ABSTRACT

The present disclosure relates to an apparatus and method for controlling object detection. The object detection control apparatus according to the present disclosure includes a determination device that determines a risk level, based on environmental information of a vehicle detected by first sensors, an object detection device that detects an object in the vehicle, based on information detected by a second sensor for detecting the object in the vehicle, an output device that outputs an alarm signal according to a set alarm condition when the object in the vehicle is detected, and a controller that controls an operation of the second sensor or the output device, based on the determined risk level.

20 Claims, 13 Drawing Sheets

(56) References Cited

U.S. PATENT DOCUMENTS

| | | | |
|---|---|---|---|
| 2014/0233796 A1* | 8/2014 | Tanaka | G06T 7/194 |
| | | | 382/103 |
| 2015/0032288 A1* | 1/2015 | Huth | G08G 1/165 |
| | | | 701/1 |
| 2016/0200168 A1* | 7/2016 | Boyer | H04R 19/04 |
| | | | 701/45 |
| 2016/0249815 A1* | 9/2016 | Freeman | H04W 4/029 |
| | | | 600/483 |
| 2017/0036512 A1* | 2/2017 | Willard, Jr. | B60H 1/00892 |
| 2017/0088044 A1* | 3/2017 | Hensley | B60Q 5/005 |
| 2017/0240022 A1* | 8/2017 | Ireri | B60N 2/26 |
| 2017/0282822 A1* | 10/2017 | Hunter, Jr. | B60K 35/00 |
| 2018/0065504 A1* | 3/2018 | Lan | B60N 2/002 |
| 2018/0170213 A1* | 6/2018 | Lu-Dac | A61B 5/0507 |
| 2018/0261069 A1* | 9/2018 | Honey-Jones | G08B 13/19697 |
| 2018/0281709 A1* | 10/2018 | Mendez | B60N 2/002 |
| 2018/0370431 A1* | 12/2018 | Wincek | G01V 3/088 |

\* cited by examiner

| INDOOR TEMPERATURE (T_in) | SCORE (X) |
|---|---|
| T_in < a1 | X1 |
| a1 ≤ T_in < a2 | X2 |
| a2 ≤ T_in | X3 |

FIG. 3A

| ILLUMINANCE (I) | SCORE (Y) |
|---|---|
| I < b1 | Y3 |
| b1 ≤ I < b2 | Y2 |
| b2 ≤ I | Y1 |

FIG. 3B

| RISK SCORE ($|R|$) | RISK LEVEL (L) |
|---|---|
| $|R| < r1$ | L0 |
| $r1 \leq |R| < r2$ | L1 |
| $r2 \leq |R| < r3$ | L2 |
| $r3 \leq |R| < r4$ | L3 |
| $r4 \leq |R| < r5$ | L4 |
| $r5 \leq |R|$ | L5 |

FIG. 4

| OUTDOOR TEMPERATURE (T_out) | SCORE (Z) |
|---|---|
| $T\_out < c1$ | $Z1$ |
| $c1 \leq T\_out < c2$ | $Z2$ |
| $c2 \leq T\_out$ | $Z3$ |

FIG. 5

| RISK LEVEL (L) | SENSOR OPERATION CONTROL | | ALARM |
|---|---|---|---|
| | DETECTION FREQUENCY | DETECTION PERIOD | ALARM TIME |
| L0 | N0 | D0 | H0 |
| L1 | N1 | D1 | H1 |
| L2 | N2 | D2 | H2 |
| L3 | N3 | D3 | H3 |
| L4 | N4 | D4 | H4 |
| L5 | N5 | D5 | H5 |

FIG. 6

| | ENVIRONMENTAL CONDITION | | RISK DETERMINATION RESULT | | OTHERS | SENSOR OPERATION CONTROL | | RISK LEVEL | ALARM TIME |
|---|---|---|---|---|---|---|---|---|---|
| | INDOOR TEMPERATURE | ILLUMINANCE SENSOR VALUE | R (=T+a) | RISK SCORE(\|R\|) | EXPLANATION OF SITUATION | DETECTION FREQUENCY | DETECTION PERIOD | | |
| 711 | BELOW 10°C | LESS THAN 30 | -7 | 7 | - | 7 TIMES | 10 MIN | L2 | 25 SEC+ 15 SEC |
| 712 | BELOW 10°C | 30 OR MORE AND LESS THAN 70 | -8 | 8 | - | | | L2 | 25 SEC+ 30 SEC |
| 713 | BELOW 10°C | 70 OR MORE | -9 | 9 | COLD AND DARK | | | L3 | 25 SEC+ 30 SEC |
| 714 | 10°C TO 30°C | LESS THAN 30 | 4 | 4 | - | | | L1 | DEFAULT (25 SEC) |
| 715 | 10°C TO 30°C | 30 OR MORE AND LESS THAN 70 | 3 | 3 | - | 5 TIMES | 20 MIN | L0 | 25 SEC- 15 SEC |
| 716 | 10°C TO 30°C | 70 OR MORE | 2 | 2 | - | | | L0 | 25 SEC- 15 SEC |
| 717 | ABOVE 30°C | LESS THAN 30 | 13 | 13 | HOT AND BRIGHT | 9 TIMES | 5 MIN | L5 | 25 SEC+ 1 MIN |
| 718 | ABOVE 30°C | 30 OR MORE AND LESS THAN 70 | 12 | 12 | - | | | L4 | 25 SEC+ 45 SEC |
| 719 | ABOVE 30°C | 70 OR MORE | 11 | 11 | - | | | L4 | 25 SEC+ 45 SEC |

FIG. 7

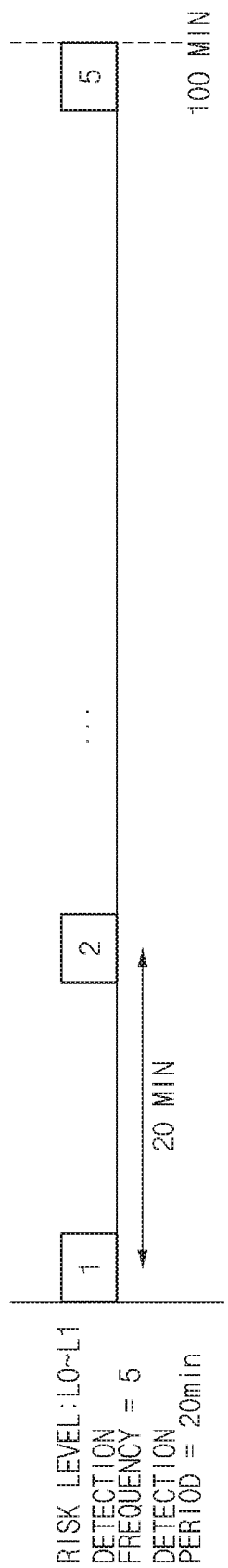

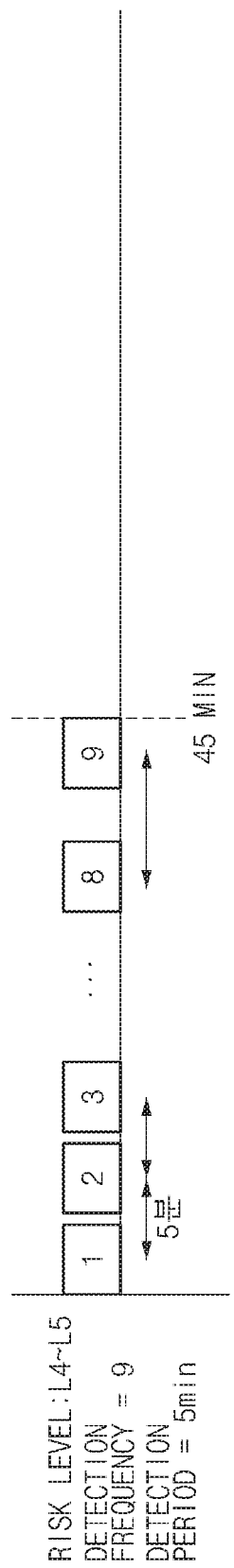

APPARATUS AND METHOD FOR CONTROLLING OBJECT DETECTION

CROSS-REFERENCE TO RELATED APPLICATIONS

This application claims priority to Korean Patent Application No. 10-2018-0140285, filed in the Korean Intellectual Property Office on Nov. 14, 2018, which application is hereby incorporated herein by reference.

TECHNICAL FIELD

The present disclosure relates to an apparatus and method for controlling object detection.

BACKGROUND

A conventional technology for detecting an object in a vehicle is a human detection technology based on radar, the operating current of which is relatively high, compared to those of other sensor technologies. Since the current is too high for the vehicle in an IGN-off state to use for a long time, the battery of the vehicle may be discharged if an object detection system is always switched on. However, in terms of usability, accuracy may be improved by making repeated measurements for a long time within a limit allowed by the system.

The conventional object detection system controls a sensor operation and an alarm operation according to preset absolute conditions, irrespective of a temperature difference between day and night or a difference between indoor temperature and outdoor temperature.

In a less dangerous situation or a very dangerous situation, the conventional object detection system controls the sensor operation and the alarm operation under the same condition, and therefore efficiency may be degraded.

SUMMARY

Embodiments described in the present disclosure can solve problems occurring in the prior art while advantages achieved by the prior art are maintained intact.

An aspect of the present disclosure provides an object detection control apparatus and method for determining a risk according to environmental conditions and adjusting an operating condition of an object detection sensor and an alarm condition according to the determined risk, rather than controlling a sensor and an alarm according to absolute conditions, when detecting an object in a vehicle. This technique can improve the efficiency of object detection and alarm.

The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, an apparatus for controlling object detection includes a determination device that determines a risk level based on environmental information of a vehicle detected by first sensors. An object detection device detects an object in the vehicle based on information detected by a second sensor for detecting the object in the vehicle. An output device outputs an alarm signal according to a set alarm condition when the object in the vehicle is detected. A controller controls an operation of the second sensor or the output device, based on the determined risk level.

The environmental information may include indoor temperature information and illuminance information.

The determination device may calculate a risk score, based on the environmental information of the vehicle and may determine the risk level corresponding to the calculated risk score.

The determination device may calculate an indoor temperature score and an illuminance score using indoor temperature information and illuminance information and may calculate the risk score from an absolute value of the sum of the indoor temperature score and the illuminance score.

The environmental information may further include outdoor temperature information.

The apparatus may further include a setting device that sets a sensor operating condition and an alarm condition, based on the determined risk level.

The setting device may import a table in which sensor detection frequencies, sensor detection periods, and alarm time are defined in advance for risk levels, respectively, and may set the sensor operating condition and the alarm condition that correspond to the risk level, based on the imported table.

The setting device may set the alarm condition to release all or some alarms when a preset alarm release condition is satisfied.

The setting device may set the alarm condition to release alarms of some alarm means during a preset time interval.

The setting device may variably set the alarm condition according to an input of a user.

The output device may output the alarm signal to an alarm device including at least one alarm means among hazard lights and a horn according to the set alarm condition.

The output device may transmit the alarm signal to a user's communication device, with which a communication connection is established, according to the set alarm condition.

According to another aspect of the present disclosure, a method for controlling object detection includes a step of determining a risk level, based on environmental information of a vehicle detected by first sensors and a step of controlling an operation of a second sensor based on the determined risk level. The second sensor detects information about an object in the vehicle. The method also includes a step of detecting the object based on the information detected by the second sensor, and a step of outputting an alarm signal according to a set alarm condition when the object in the vehicle is detected.

BRIEF DESCRIPTION OF THE DRAWINGS

The above and other objects, features and advantages of the present disclosure will be more apparent from the following detailed description taken in conjunction with the accompanying drawings:

FIGS. 3A, 3B and 4 to 7 are views illustrating embodiments referred to in a description of an operation of the object detection control apparatus according to an embodiment of the present disclosure;

FIGS. 8A to 8C are views illustrating embodiments referred to in a description of an operation of the object detection control apparatus according to another embodiment of the present disclosure;

DETAILED DESCRIPTION OF ILLUSTRATIVE EMBODIMENTS

Figure 1:
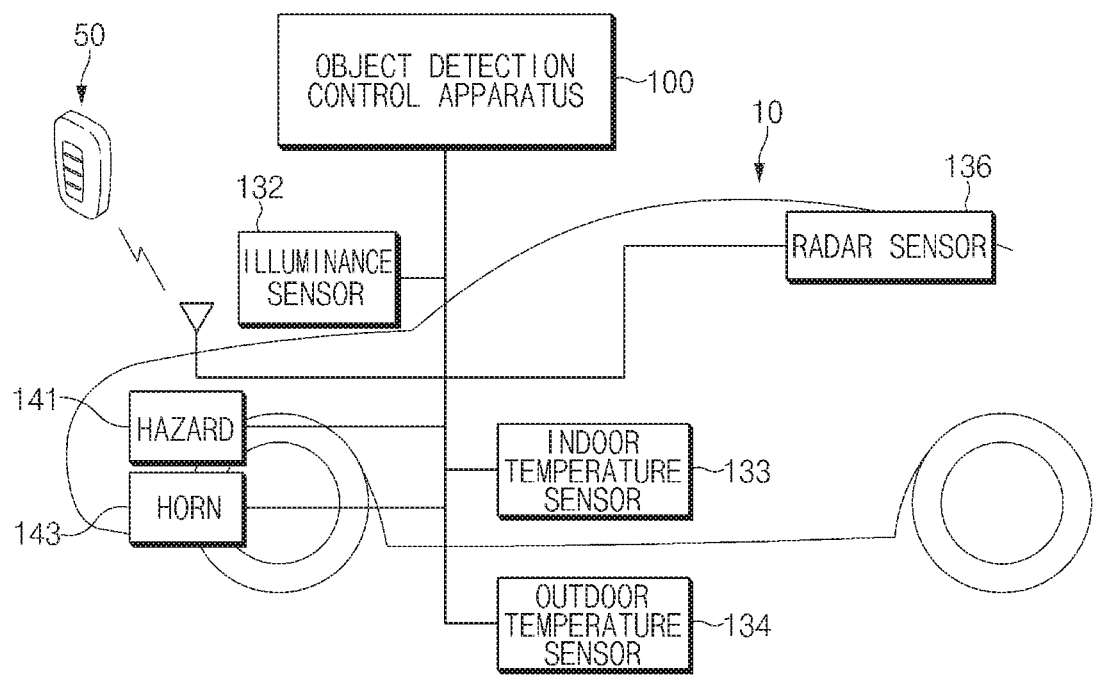
FIG. 1 is a view illustrating a vehicle having an object detection control apparatus applied thereto according to an embodiment of the present disclosure.

Hereinafter, exemplary embodiments of the present disclosure will be described in detail with reference to the accompanying drawings. It should be understood that even if shown in different drawings, identical elements are provided with identical reference numerals in the drawings. Furthermore, in describing the embodiments of the present disclosure, detailed descriptions related to well-known functions or configurations will be omitted when they may make subject matters of the present disclosure unnecessarily obscure.

Terms, such as "first", "second", "A", "B", "(a)", "(b)", and the like, may be used herein to describe elements of the present disclosure. Such terms are only used to distinguish one element from another element, and the substance, sequence, order, or number of these elements is not limited by these terms. Unless otherwise defined, all terms used herein, including technical and scientific terms, have the same meaning as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

FIG. 1 is a view illustrating a vehicle having an object detection control apparatus 100 applied thereto according to an embodiment of the present disclosure.

Referring to FIG. 1, the object detection control apparatus 100 may be included in the vehicle to detect an object left in the vehicle.

The object detection control apparatus 100 may determine a risk using environmental information detected by first sensors for detecting the environmental information and may set a sensor operating condition and an alarm condition according to the determined risk. For example, the first sensors may include an illuminance sensor 132, an indoor temperature sensor (e.g., thermometer or thermocouple) 133, and an outdoor temperature sensor 134.

The object detection control apparatus 100 may control an operation of a second sensor for detecting information about the object in the vehicle, based on the sensor operating condition set according to the risk and may detect the object left in the vehicle. For example, the second sensor may include a radar sensor 136.

The object detection control apparatus 100 may detect a child, an infant, and/or a pet left in the vehicle by using information detected by the second sensor.

When the object left in the vehicle is detected by the second sensor, the object detection control apparatus 100 may control an operation of an alarm means, based on the alarm condition set according to the risk and may output an alarm. For example, the alarm means may include hazard lights 141 and a horn 143.

As described above, the object detection control apparatus 100 according to the present disclosure, when detecting the object in the vehicle, may efficiently control the sensor operation and the alarm according to the conditions adjusted based on the risk that is determined according to the environmental conditions rather than absolute conditions.

A detailed configuration of the object detection control apparatus 100 according to the present disclosure will be described below in more detail with reference to FIG. 2.

The object detection control apparatus 100 according to the embodiment of the present disclosure may be implemented inside the vehicle. In this case, the object detection control apparatus 100 may be integrally formed with control units in the vehicle, or may be implemented to be a separate device and connected to the control units of the vehicle by separate connecting devices.

Figure 2:
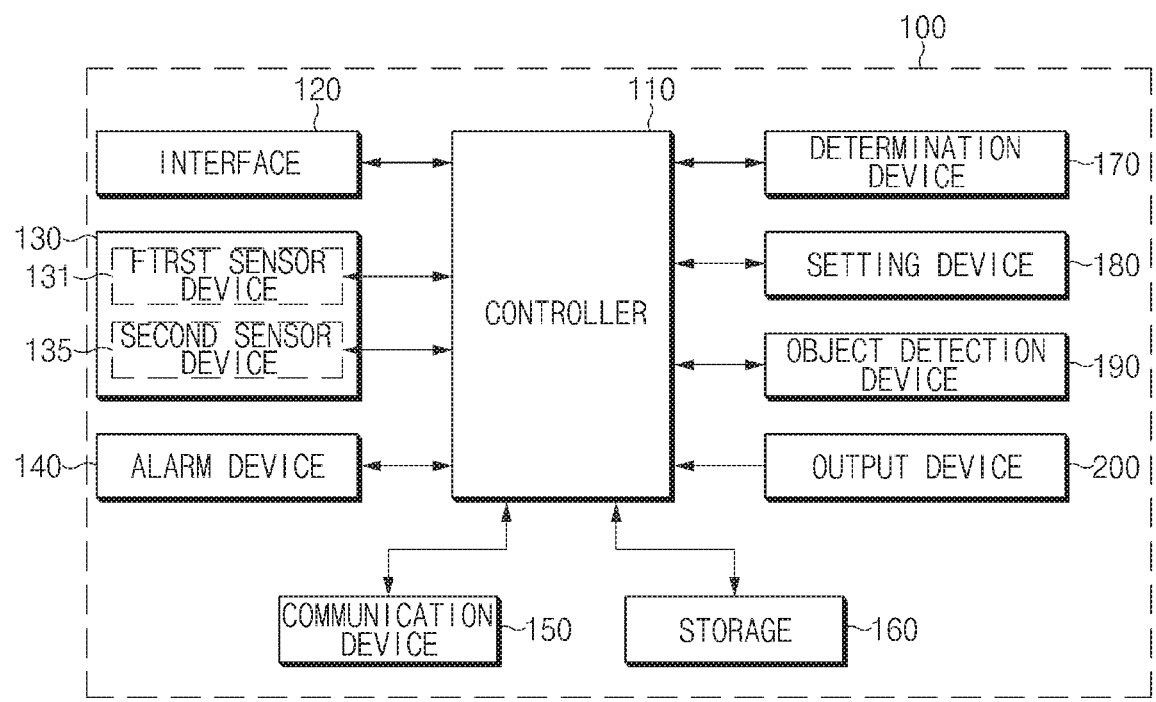
FIG. 2 is a view illustrating a configuration of the object detection control apparatus according to an embodiment of the present disclosure.

FIG. 2 is a view illustrating a configuration of the object detection control apparatus 100 according to an embodiment of the present disclosure.

Referring to FIG. 2, the object detection control apparatus 100 may include a controller no, an interface 120, a sensor device 130, an alarm device 140, a communication device 150, a storage (memory) 160, a determination device 170, a setting device 180, an object detection device 190, and an output device 200. The controller no, the determination device 170, the setting device 180, the object detection device 190, and the output device 200 of the object detection control apparatus 100 according to the embodiment of the present disclosure may be implemented as at least one processor (see e.g., processor 1100 illustrated in FIG. 10). Software operating on the processor(s) is described in detail below.

The controller no may process signals transferred between the components of the object detection control apparatus 100.

The interface 120 may include an input device for receiving a control command from a user and an output device for outputting operating statuses and results of the object detection control apparatus 100.

The input device may include a key button. The input device may also include a mouse, a joystick, a jog shuttle, a stylus pen, or the like. Furthermore, the input device may also include a soft key implemented on a display.

For example, the user may modify an alarm condition through the input device. Also, the user may enter an exception condition and/or an alarm release command through the input device.

The output device may include a display. In the case where the display includes a touch sensor such as a touch film, a touch sheet, a touch pad, or the like, the display may operate as a touch screen and may be implemented in a form in which the input device and the output device are integrated with each other.

The display may include at least one of a liquid crystal display (LCD), a thin film transistor liquid crystal display (TFF LCD), an organic light-emitting diode (OLED) display, a flexible display, a field emission display (FED), and a three-dimensional (3D) display.

For example, the display may display, on a screen, information about a risk determined according to environmental conditions, and a sensor operating condition and an alarm condition that are set according to the risk. Furthermore, the display may also display a screen through which the user modifies the alarm condition or enters the exception condition and/or the alarm release command.

The sensor device 130 may include a first sensor device 131 including first sensors for detecting environmental information, and a second sensor device 135 including a second sensor for detecting information about an object in the vehicle.

The first sensors may include the illuminance sensor 132 and the indoor temperature sensor 133. The illuminance sensor 132 and the indoor temperature sensor 133 may operate according to control commands of the controller no and may detect and transmit illuminance information and indoor temperature information of the vehicle to the controller 110. The controller no may transfer, to the determination device 170, the illuminance information and the indoor temperature information received from the first sensors.

The second sensor may include the radar sensor 136. The radar sensor 136 may operate according to a control command of the controller 110. The radar sensor 136 may detect information about an object located in a predetermined area in the vehicle, for example, a seat of the vehicle and/or a surrounding area thereof and may transmit the object information to the controller 110. In the embodiment of the present disclosure, it is exemplified that the second sensor is the radar sensor 136. However, the second sensor is not limited thereto, and any sensor capable of detecting information about the object in the vehicle may be applicable.

The alarm device 140 may output an alarm according to a control command from the output device 200 when the object in the vehicle is detected. The alarm device 140 may include one or more alarm means such as the hazard lights 141 and the horn 143. The horn 143 may be off controlled during a preset time interval, for example, from 5 P.M. to 5 A.M.

The communication device 150 may include a communication module that supports communication interface with electronic units and/or control units included in the vehicle. The communication module may include a module that supports vehicle network communication such as controller area network (CAN) communication, CAN-FD communication, local interconnect network (LIN) communication, Flex-Ray communication, or the like.

Furthermore, the communication device 150 may include a communication module that supports communication interface with a registered communication device, for example, a smart key and/or a portable terminal. Here, the communication module may include a module for wireless Internet connection or a module for short range communication. Examples of the wireless Internet technology may include wireless LAN (WLAN), wireless broadband (Wibro), Wi-Fi, and the like, and examples of the short range communication technology may include Bluetooth, ZigBee, ultra wideband (UWB), radio frequency identification (RFID), and the like.

The storage 160 may store data and/or an algorithm necessary for operating the object detection control apparatus 100.

For example, the storage 160 may store illuminance information and indoor temperature information detected by the first sensors and object detection information detected by the second sensor. Furthermore, the storage 160 may store information of risk scores and risk levels determined by the determination device 170 and a command and/or an algorithm for calculating a risk score based on the illuminance information and the indoor temperature information. In addition, the storage 160 may store sensor operating conditions and alarm conditions for respective risk levels and may store a sensor operating condition and an alarm condition set based on a risk level that is set to correspond to a risk score calculated by the determination device 170.

The storage 160 may include a storage medium such as a random access memory (RAM), a static random access memory (SRAM), a read-only memory (ROM), a programmable read-only memory (PROM), or an electrically erasable programmable read-only memory (EEPROM).

The controller no, when starting an object detection operation, may operate the first sensors to detect illuminance information and indoor temperature information. When starting the object detection operation, the controller no may initially operate the second sensor before operating the first sensors.

When the illuminance information and the indoor temperature information are detected by the first sensors, the controller no may transfer, to the determination device 170, the illuminance information and the indoor temperature information received from the first sensors.

The determination device 170 may calculate an indoor temperature score using the indoor temperature information transferred from the controller no. Indoor temperature scores corresponding to respective indoor temperature ranges may be defined in advance in a first table and stored in the storage 160. The determination device 170 may calculate the indoor temperature score corresponding to the indoor temperature information with reference to the first table of FIG. 3A.

Referring to FIG. 3A, the indoor temperature score X may be $X_1$ when the indoor temperature T_in is lower than $a_1$, $X_2$ when the indoor temperature T_in is not lower than $a_1$ and is lower than $a_2$, and $X_3$ when the indoor temperature T_in is not lower than $a_2$. In this case, $a_1$ and $a_2$ may be values that satisfy the condition $a_1<a_2$, and $X_1$, $X_2$, and $X_3$ may be values that satisfy the condition $X_1<X_2<X_3$.

Here, $a_1$ and $a_2$ may refer to a lower limit temperature and an upper limit temperature, respectively, and may be defined in advance. For example, $a_1$ and $a_2$ may be defined to be 10° C. and 30° C., respectively.

The values of $X_1$, $X_2$, and $X_3$ may all be defined to be positive integers, or only a part of the values may be defined to be a negative integer. For example, $X_1$, $X_2$, and $X_3$ may be defined to be −10, 1, and 10, respectively.

The values of $a_1$, $a_2$, $X_1$, $X_2$, and $X_3$ may be adjusted according to embodiments without any specific limitation.

The determination device 170 may calculate an illuminance score using the illuminance information transferred from the controller no. Illuminance scores corresponding to respective illuminance ranges may be defined in advance in a second table and stored in the storage 160. The determination device 170 may calculate the illuminance score corresponding to the illuminance information with reference to the second table of FIG. 3B.

Referring to FIG. 3B, the illuminance score Y may be $Y_3$ when the illuminance I is less than $b_1$, $Y_2$ when the illuminance I is not less than $b_1$ and is less than $b_2$, and $Y_1$ when the illuminance I is not less than $b_2$. In this case, $b_1$ and $b_2$ may be values that satisfy the condition $b_1<b_2$, and $Y_1$, $Y_2$, and $Y_3$ may be values that satisfy the condition $Y_1<Y_2<Y_3$.

Here, $b_1$ and $b_2$ may refer to a lower limit illuminance and an upper limit illuminance, respectively, and may be defined in advance. For example, $b_1$ and $b_2$ may be defined to be 30 and 70, respectively.

The values of $Y_1$, $Y_2$, and $Y_3$ may all be defined to be positive integers, or only a part of the values may be defined to be a negative integer. For example, $Y_1$, $Y_2$, and $Y_3$ may be defined to be 1, 2, and 3, respectively.

The values of $b_1$, $b_2$, $Y_1$, $Y_2$, and $Y_3$ may be adjusted according to embodiments without any specific limitation.

The determination device 170 may calculate a risk score, based on the indoor temperature score and the illuminance score calculated through the embodiments of FIGS. 3A and 3B and may determine a risk level corresponding to the calculated risk score.

The determination device 170 may calculate the risk score using Equation 1 below.

$$|R|=|X+Y| \qquad \text{[Equation 1]}$$

In Equation 1, $|R|$ denotes the risk score, X denotes the indoor temperature score, and Y denotes the illuminance score.

The determination device 170 may determine the risk level corresponding to the risk score calculated by Equation 1. Risk levels corresponding to respective range of risk scores may be defined in advance in a third table and stored in the storage 160. The determination device 170 may determine the risk level corresponding to the risk score with reference to the third table of FIG. 4.

Referring to FIG. 4, the risk level L may be $L_0$ when the risk score $|R|$ is less than $r_1$, $L_1$ when the risk score $|R|$ is not less than $r_1$ and is less than $r_2$, $L_2$ when the risk score $|R|$ is not less than $r_2$ and is less than $r_3$, $L_3$ when the risk score $|R|$ is not less than $r_3$ and is less than $r_4$, $L_4$ when the risk score $|R|$ is not less than $r_4$ and is less than $r_5$, and $L_5$ when the risk score $|R|$ is not less than $r_5$.

In this case, $r_1$, $r_2$, $r_3$, $r_4$, and $r_5$ may be values that satisfy the condition $r_1<r_2<r_3<r_4<r_5$ and may be defined in advance. For example, $r_1$, $r_2$, $r_3$, $r_4$, and $r_5$ may be defined to be 4, 7, 9, 11, and 13, respectively. The values of $r_1$ to $r_5$ may be adjusted according to embodiments without any specific limitation.

$L_0$ may refer to the lowest risk level, and $L_5$ may refer to the highest risk level.

While FIG. 4 illustrates an example that risk levels are classified into six steps according to risk scores, the present disclosure is not limited thereto, and the number of risk levels may be increased or decreased according to embodiments.

In another embodiment, the determination device 170 may determine a risk level by additionally reflecting outdoor temperature information, in addition to the indoor temperature information and the illuminance information.

The determination device 170 may calculate an outdoor temperature score using outdoor temperature information detected by the first sensors. Outdoor temperature scores corresponding to respective outdoor temperature ranges may be defined in advance in a fourth table, as in the first and second tables, and may be stored in the storage 160 The determination device 170 may calculate the outdoor temperature score corresponding to the outdoor temperature information with reference to the fourth table of FIG. 5.

Referring to FIG. 5, the outdoor temperature score Z may be $Z_1$ when the outdoor temperature T_out is lower than $c_1$, $Z_2$ when the outdoor temperature T_out is not lower than $c_1$ and is lower than $c_2$, and $Z_3$ when the outdoor temperature T_out is not lower than $c_2$. In this case, $c_1$ and $c_2$ may be values that satisfy the condition $c_1<c_2$, and $Z_1$, $Z_2$, and $Z_3$ may be values that satisfy the condition $Z_1<Z_2<Z_3$.

Here, $c_1$ and $c_2$ may refer to a lower limit temperature and an upper limit temperature, respectively, and may be defined in advance. For example, $c_1$ and $c_2$ may be defined to be 5° C. and 30° C., respectively.

The values of $Z_1$, $Z_2$, and $Z_3$ may all be defined to be positive integers, or only a part of the values may be defined to be a negative integer. The values of $c_1$, $c_2$, $Z_1$, $Z_2$, and $Z_3$ may be adjusted according to embodiments without any specific limitation.

The determination device 170 may calculate a risk score, based on the indoor temperature score and the illuminance score calculated through the embodiments of FIGS. 3A and 3B and the outdoor temperature score calculated through the embodiment of FIG. 5 and may determine a risk level corresponding to the calculated risk score.

In this case, the determination device 170 may calculate the risk score using Equation 2 below.

$$|R|=|X+Y+Z| \qquad \text{[Equation 2]}$$

In Equation 2, $|R|$ denotes the risk score, X denotes the indoor temperature score, Y denotes the illuminance score, and Z denotes the outdoor temperature score.

The determination device 170 may determine the risk level corresponding to the risk score calculated by Equation 2.

However, in the following embodiments, it will be exemplified that a risk level is determined to correspond to a risk score calculated from an indoor temperature score and an illuminance score.

When the risk level corresponding to the calculated risk score is determined, the determination device 170 may transmit information on the risk level to the controller no. The controller no may control an operation of the setting device 180 according to the risk level.

When the information on the risk level is received from the controller no, the setting device 180 may set a sensor operating condition and an alarm condition, based on the received risk level.

Sensor operating conditions and alarm conditions that correspond to respective risk levels may be defined in advance in a fifth table and stored in the storage 160. The setting device 180 may set the sensor operating condition and the alarm condition that correspond to the risk level, with reference to the fifth table of FIG. 6.

Referring to FIG. 6, the setting device 180 may set a sensor detection frequency and a sensor detection period, and the type of alarm and/or an alarm strategy according to the risk level.

The sensor detection frequency, the sensor detection period, and alarm time may be differently set according to the risk level as in the fifth table of FIG. 6. Meanwhile, the sensor detection frequency and the sensor detection period may be set to correspond to at least two risk levels according to a range of risk level. Embodiments relating to this operation will be described with reference to FIG. 7.

In the embodiments of FIG. 7, it is assumed that $a_1=10°$ C., $a_2=30°$ C., $X_1=-10$, $X_2=1$, and $X_3=10$ in the first table of FIG. 3A, $b_1=30$, $b_2=70$, $Y_1=1$, $Y_2=2$, and $Y_3=3$ in the second table of FIG. 3B, $r_1=4$, $r_2=7$, $r_3=9$, $r_4=11$, and $r_5=13$ in the third table of FIG. 4, and $N_0$ and $N_1=5$, $N_2$ and $N_3=7$, $N_4$ and $N_5=9$, $D_0$ and $D_1=20$, $D_2$ and $D_3=10$, $D_4$ and $D_5=5$, $H_0=25$ sec–15 sec, $H_1=25$ sec, $H_2=25$ sec+15 sec, $H_3=25$ sec+30 sec, $H_4=25$ sec+45 sec, and $H_5=25$ sec+1 min in the fifth table of FIG. 6.

Referring to reference numeral 711 of FIG. 7, the indoor temperature score may be –10 when the indoor temperature is lower than 10° C., and the illuminance score may be 3 when the illuminance is less than 30. Accordingly, the risk score may be $|R|=|-10+3|=7$, and the risk level corresponding to the risk score of 7 may be $L_2$.

Referring to reference numeral 712 of FIG. 7, the indoor temperature score may be –10 when the indoor temperature is lower than 10° C., and the illuminance score may be 2 when the illuminance is not less than 30 and is less than 70. Accordingly, the risk score may be $|R|=|-10+2|=8$, and the risk level corresponding to the risk score of 8 may be $L_2$.

Based on risk level $L_2$, the setting device 180 may set the sensor detection frequency to 7 times and the sensor detection period to 10 min and may set the alarm time to 40 sec (=25 sec+15 sec), that is, the sum of the default alarm time of 25 sec and a first weighting value of 15 sec.

Referring to reference numeral 713 of FIG. 7, the indoor temperature score may be −10 when the indoor temperature is lower than 10° C., and the illuminance score may be 1 when the illuminance is not less than 70. Accordingly, the risk score may be $|R|=|-10+1|=9$, and the risk level corresponding to the risk score of 9 may be $L_3$.

Based on risk level $L_3$, the setting device 180 may set the sensor detection frequency to 7 times and the sensor detection period to 10 min and may set the alarm time to 55 sec (=25 sec+30 sec), that is, the sum of the default alarm time of 25 sec and a second weighting value of 30 sec.

Referring to reference numeral 714 of FIG. 7, the indoor temperature score may be 1 when the indoor temperature is not lower than 10° C. and is lower than 30° C., and the illuminance score may be 3 when the illuminance is less than 30. Accordingly, the risk score may be $|R|=|1+3|=4$, and the risk level corresponding to the risk score of 4 may be $L_1$.

Based on risk level $L_1$, the setting device 180 may set the sensor detection frequency to 5 times and the sensor detection period to 20 min and may set the alarm time to the default alarm time of 25 sec. While it is exemplified that the alarm time corresponding to $L_1$ is set to the default alarm time, the alarm time corresponding to $L_1$ is not limited thereto.

Referring to reference numeral 715 of FIG. 7, the indoor temperature score may be 1 when the indoor temperature is not lower than 10° C. and is lower than 30° C., and the illuminance score may be 2 when the illuminance is not less than 30 and is less than 70. Accordingly, the risk score may be $|R|=|1+2|=3$, and the risk level corresponding to the risk score of 3 may be $L_0$.

Referring to reference numeral 716 of FIG. 7, the indoor temperature score may be 1 when the indoor temperature is not lower than 10° C. and is lower than 30° C., and the illuminance score may be 1 when the illuminance is not less than 70. Accordingly, the risk score may be $|R|=|1+1|=2$, and the risk level corresponding to the risk score of 2 may be $L_0$.

Based on risk level $L_0$, the setting device 180 may set the sensor detection frequency to 5 times and the sensor detection period to 20 min and may set the alarm time to 10 sec (=25 sec−15 sec), that is, the difference of the default alarm time of 25 sec and the first weighting value of 15 sec.

Referring to reference numeral 717 of FIG. 7, the indoor temperature score may be 10 when the indoor temperature is higher than 30° C., and the illuminance score may be 3 when the illuminance is less than 30. Accordingly, the risk score may be $|R|=|10+3|=13$, and the risk level corresponding to the risk score of 13 may be $L_5$.

Based on risk level $L_5$, the setting device 180 may set the sensor detection frequency to 9 times and the sensor detection period to 5 min and may set the alarm time to 1 min and 25 sec (=25 sec+1 min), that is, the sum of the default alarm time of 25 sec and a fourth weighting value of 1 min.

Referring to reference numeral 718 of FIG. 7, the indoor temperature score may be 10 when the indoor temperature is higher than 30° C., and the illuminance score may be 2 when the illuminance is not less than 30 and is less than 70. Accordingly, the risk score may be $|R|=|10+2|=12$, and the risk level corresponding to the risk score of 12 may be $L_4$.

Referring to reference numeral 719 of FIG. 7, the indoor temperature score may be 10 when the indoor temperature is higher than 30° C., and the illuminance score may be 1 when the illuminance is not less than 70. Accordingly, the risk score may be $|R|=|10+1|=11$, and the risk level corresponding to the risk score of 11 may be $L_4$.

Based on risk level $L_4$, the setting device 180 may set the sensor detection frequency to 9 times and the sensor detection period to 5 min and may set the alarm time to 70 sec (=25 sec+45 sec), that is, the sum of the default alarm time of 25 sec and a third weighting value of 45 sec.

As described above, the setting device 180 may determine the risk level according to the indoor temperature condition and the illuminance condition and may variably set the sensor operating condition and the alarm condition based on the determined risk level.

The setting device 180 may set the alarm condition to release an alarm in response to a request of the user. The setting device 180 may set the alarm condition to release only alarms corresponding to some predetermined risk levels or to release all alarms irrespective of the risk levels.

The setting device 180 may set the alarm condition to release all or some alarms, or to release alarms of some alarm means, when a preset alarm release condition is satisfied. For example, the setting device 180 may set the alarm condition to release an alarm of the horn 143 during the time interval from 5 P.M. to 5 A.M.

The setting device 180 may transmit, to the controller 110, information about the sensor operating condition and the alarm condition that are set based on the risk level. The controller no may store the sensor operating condition and the alarm condition received from the setting device 180 in the storage 160 and may output a driving signal to the second sensor according to the sensor operating condition. Furthermore, the controller no may transfer the information about the alarm condition to the output device 200.

The second sensor device 135 may operate the second sensor according to the driving signal of the controller no.

Embodiments of operating the second sensor according to the set sensor operating condition will be described with reference to FIGS. 8A to 8C.

FIG. 8A illustrates an embodiment in which the detection frequency and the detection period are set to 5 times and 20 min, respectively, for the risk levels $L_0$ and $L_1$.

As illustrated in FIG. 8A, the second sensor may operate 5 times in 20-min periods to detect information about an object in the vehicle. Since the risk levels are low, an unnecessary operation of the second sensor may be minimized by decreasing the detection frequency and increasing the detection period.

Figure 8B:
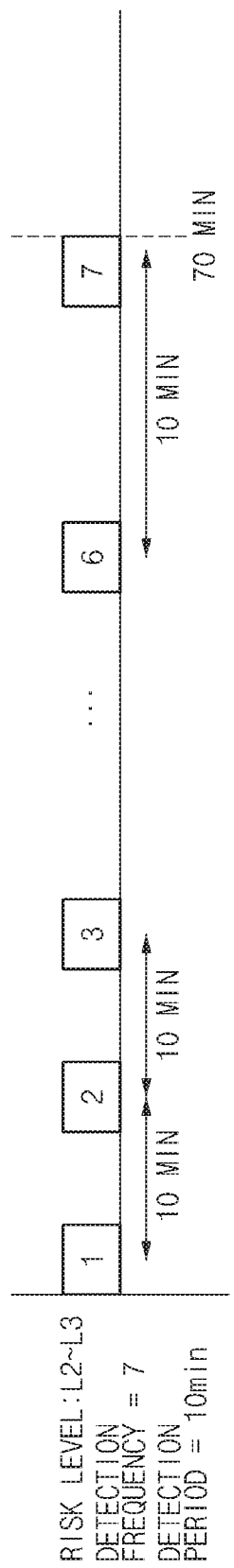

FIG. 8B illustrates an embodiment in which the detection frequency and the detection period are set to 7 times and 10 min, respectively, for the risk levels $L_2$ and $L_3$.

As illustrated in FIG. 8B, the second sensor may operate 7 times in 10-min periods to detect information about the object in the vehicle. Since the risk levels are moderate, an operation of the second sensor may be efficiently controlled by increasing the detection frequency to be greater than that in the embodiment of FIG. 8A and by decreasing the detection period to be less than that in the embodiment of FIG. 8A.

FIG. 8C illustrates an embodiment in which the detection frequency and the detection period are set to 9 times and 5 min, respectively, for the risk levels $L_4$ and $L_5$.

As illustrated in FIG. 8C, the second sensor may operate 9 times in 5-min periods to detect information about the object in the vehicle. Since the risk levels are high, the object left in the vehicle may be stably detected by increasing the detection frequency to be greater than that in the embodiment of FIG. 8B and decreasing the detection period to be less than that in the embodiment of FIG. 8B.

While the second sensor is being operated according to the set sensor operating condition, the controller 110 may transfer information detected by the second sensor to the object detection device 190. The object detection device 190 may analyze the detection information of the second sensor and may detect the object left in the vehicle.

When the object left in the vehicle is detected by analyzing the detection information of the second sensor, the object detection device 190 may transmit the object detection information to the controller 110. When receiving the object detection information from the object detection device 190, the controller 110 may control an operation of the output device 200.

Under the control of the controller 110, the output device 200 may generate an alarm signal according to the preset alarm condition and may output the alarm signal to the alarm device 140. The alarm device 140 may output an alarm through the hazard lights 141 and/or the horn 143 according to the alarm signal of the output device 200.

The output device 200 may generate an alarm signal according to the preset alarm condition and may transmit the alarm signal to the user's communication device, such as a smart key and/or a portable terminal, which is connected thereto through the communication device 150.

For example, the output device 200 may transmit an alarm signal including at least one of a text message, a push notification message, and a mobile app alarm to the user's communication device, with which a communication connection is established, according to the set alarm condition.

When the alarm is completely output according to the preset alarm condition upon detection of the object, the controller no may operate the first sensors again to re-detect illuminance information and indoor temperature information for determining a risk level.

The object detection control apparatus 100 according to the embodiment of the present disclosure, which operates as described above, may be implemented in the form of an independent hardware device that includes a memory and a processor that processes each operation, and may be operated in the form included in another hardware device such as a microprocessor or a generic-purpose computer system.

An operation of the above-configured object detection control apparatus according to the present disclosure will be described below in more detail.

Figure 9:
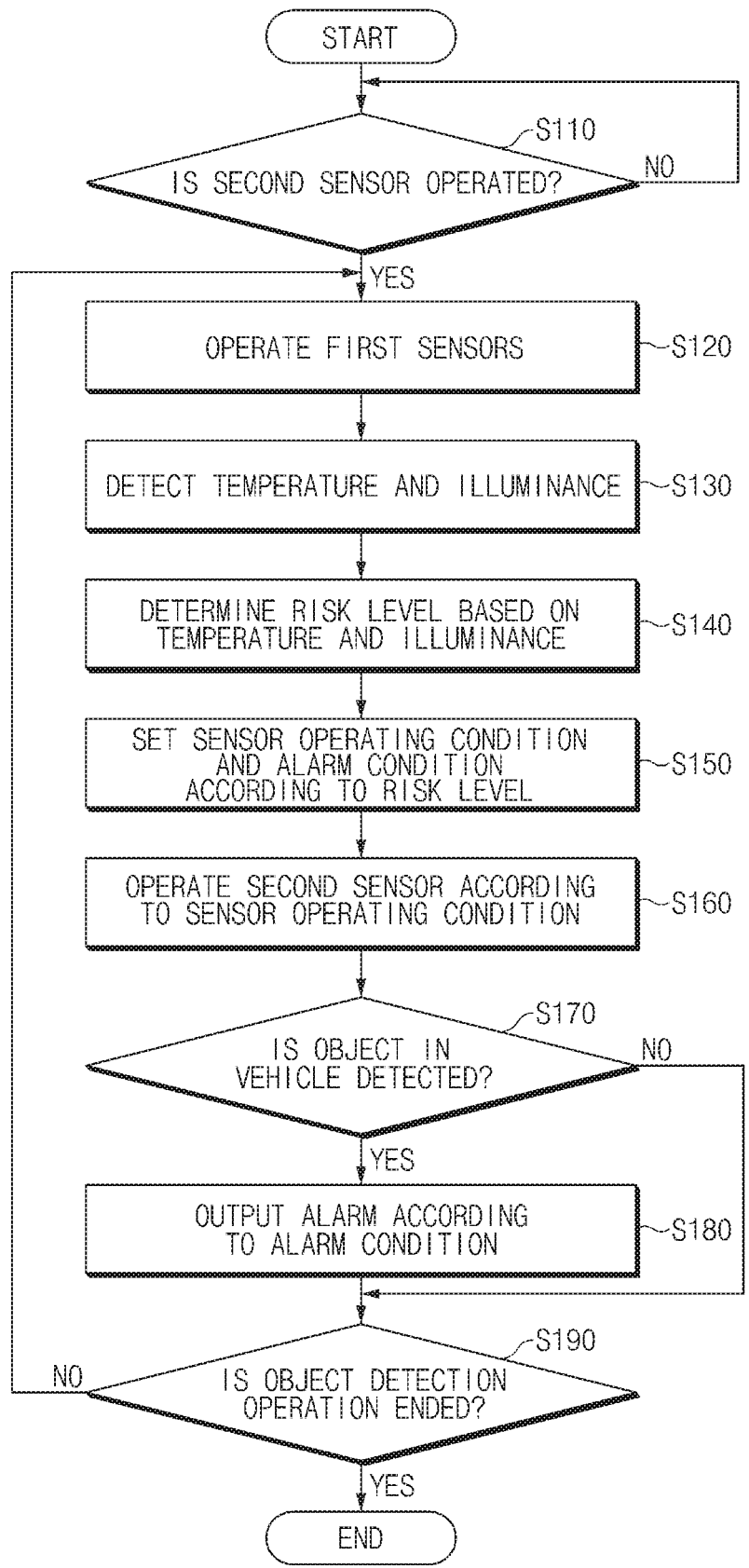
FIG. 9 is a flowchart illustrating an object detection control method according to an embodiment of the present disclosure.

FIG. 9 is a flowchart illustrating an object detection control method according to an embodiment of the present disclosure.

Referring to FIG. 9, the object detection control apparatus 100 may initially operate the second sensor when starting an object detection operation (Step S110).

The object detection control apparatus 100 may operate the first sensors (Step S120), may detect indoor temperature, outdoor temperature, and illuminance (Step S130), and may determine a risk level, based on the detected temperatures and illuminance (Step S140).

In step S140, the object detection control apparatus 100 may calculate a risk score, based on the detected temperatures and illuminance, and determine a risk level corresponding to the calculated risk score. Herein, a detailed description of the operation of calculating the risk score in step S140 may be substituted with the descriptions of the embodiments of FIGS. 3A to 4.

According to the determined risk level, the object detection control apparatus 100 may set a sensor operating condition, for example, a detection frequency and a detection period and may set an alarm condition, for example, alarm time (Step S150).

The object detection control apparatus 100 may operate the second sensor according to the sensor operating condition set in step S150 and may detect an object in the vehicle (Step S160). When it is determined in step S170 that the object in the vehicle is detected through step S160, the object detection control apparatus 100 may output an alarm according to the alarm condition set in step S250 (Step S180).

When it is determined in step S170 that the object in the vehicle is not detected, the object detection control apparatus 100 may perform the process subsequent to step S120 until a request to end the object detection operation is made in step S190.

After step S180, the object detection control apparatus 100 may repeatedly perform steps S120 to S180 until the request to end the object detection operation is made, and may end the relevant operation when the request to end the object detection operation is made (Step S190).

Figure 10:
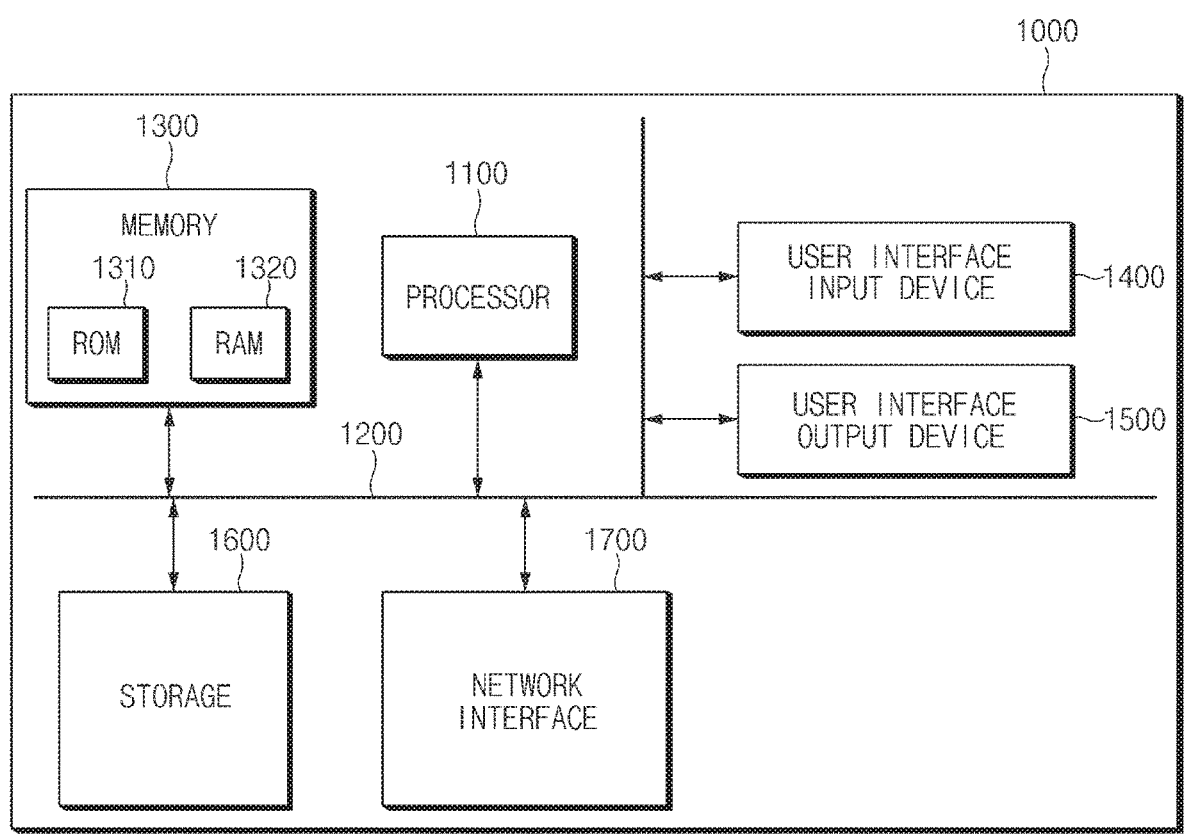
FIG. 10 is a view illustrating a computing system in which a method according to an embodiment of the present disclosure is executed.

FIG. 10 is a view illustrating a computing system 100 in which a method according to an embodiment of the present disclosure is executed.

Referring to FIG. 10, the computing system 100 may include at least one processor 1100, a memory 1300, a user interface input device 1400, a user interface output device 1500, a storage 1600, and a network interface 1700 that are connected together through a bus 1200. The processor 1100 can be a single processor as illustrated or a number of processors working together or independently.

The processor 1100 may be a central processing unit (CPU) or a semiconductor device that processes instructions stored in the memory 1300 and/or the storage 1600. The memory 1300 and the storage 1600 may include various types of volatile or non-volatile storage mediums. For example, the memory 1300 may include a read only memory (ROM) 1310 and a random access memory (RAM) 1320.

Accordingly, the steps of the methods or algorithms described above in relation to the embodiments disclosed herein may be directly implemented with a hardware module or a software module executed by the processor 1100, or a combination thereof. The software module may reside in a storage medium (that is, the memory 1300 and/or the storage 1600) such as a RAM memory, a flash memory, a ROM memory, an EPROM memory, an EEPROM memory, a register, a hard disk, a detachable disk, or a CD-ROM. The exemplary storage medium may be coupled to the processor 1100, and the processor 1100 may read information out of the storage medium and may record information in the storage medium. Alternatively, the storage medium may be integrated with the processor 1100. The processor 1100 and the storage medium may reside in an application specific integrated circuit (ASIC). The ASIC may reside in a user terminal. In another case, the processor 1100 and the storage medium may reside in the user terminal as separate components.

According to the present disclosure, the object detection control apparatus and method, when detecting an object in a vehicle, may calculate a risk score according to environmental conditions and may adjust an operating condition of an object detection sensor and an alarm condition according to the calculated risk score, rather than controlling a sensor and an alarm according to absolute conditions, thereby improving the efficiency of object detection and alarm.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

Therefore, the exemplary embodiments of the present disclosure are provided to explain the spirit and scope of the present disclosure, but not to limit them, so that the spirit and scope of the present disclosure is not limited by the embodiments. The scope of the present disclosure should be construed on the basis of the accompanying claims, and all the technical ideas within the scope equivalent to the claims should be included in the scope of the present disclosure.

What is claimed is:

1. An apparatus for controlling object detection, the apparatus comprising:
    a determination device configured to determine a risk level based on environmental information of a vehicle detected by a first sensor;
    an object detection device configured to detect an object in the vehicle based on information detected by a second sensor in the vehicle;
    an output device configured to output an alarm signal according to a set alarm condition when the object in the vehicle is detected;
    a controller configured to control an operation of the second sensor or the output device based on the determined risk level; and
    a setting device configured to import a table in which sensor detection frequencies, sensor detection periods and alarm time are defined in advance for risk levels, and set a sensor operating condition and the alarm condition corresponding to the risk level, based on the imported table.

2. The apparatus of claim 1, wherein the environmental information includes indoor temperature information and illuminance information.

3. The apparatus of claim 2, wherein the environmental information further includes outdoor temperature information.

4. The apparatus of claim 1, wherein the determination device is configured to:
    calculate a risk score based on the environmental information of the vehicle; and
    determine the risk level corresponding to the calculated risk score.

5. The apparatus of claim 4, wherein the determination device is configured to:
    calculate an indoor temperature score and an illuminance score using indoor temperature information and illuminance information; and
    calculate the risk score from an absolute value of the sum of the indoor temperature score and the illuminance score.

6. The apparatus of claim 1, wherein the setting device is configured to set the alarm condition to release all or some alarms when a preset alarm release condition is satisfied.

7. The apparatus of claim 1, wherein the setting device is configured to set the alarm condition to release alarms of some alarm means during a preset time interval.

8. The apparatus of claim 1, wherein the setting device is configured to variably set the alarm condition according to an input of a user.

9. The apparatus of claim 1, wherein the output device is configured to output the alarm signal to hazard lights or a horn according to the set alarm condition.

10. The apparatus of claim 1, wherein the output device is configured to transmit the alarm signal via a text message, a push notification message, or a mobile app alarm to a user's communication device according to the set alarm condition.

11. A method for controlling object detection, the method comprising:
    determining a risk level based on environmental information of a vehicle, the environment information detected by first sensors;
    controlling an operation of a second sensor based on the determined risk level, the second sensor being configured to detect information about an object in the vehicle;
    detecting the object based on the information detected by the second sensor;
    outputting an alarm signal according to a set alarm condition when the object in the vehicle is detected; and
    setting a sensor operating condition and an alarm condition based on the determined risk level based on an imported table, the table defining sensor detection frequencies, sensor detection periods and alarm time for risk levels, respectively.

12. The method of claim 11, wherein the environmental information includes indoor temperature information and illuminance information.

13. The method of claim 11, wherein determining the risk level comprises:
    calculating a risk score based on the environmental information of the vehicle; and
    determining the risk level corresponding to the calculated risk score.

14. The method of claim 13, wherein calculating the risk score comprises:
    calculating an indoor temperature score and an illuminance score using indoor temperature information and illuminance information; and
    calculating the risk score from an absolute value of the sum of the indoor temperature score and the illuminance score calculated.

15. The method of claim 12, wherein the environmental information further includes outdoor temperature information.

16. A vehicle comprising:
    a temperature sensor in the vehicle;
    a second sensor in the vehicle, the second sensor configured to detect an object comprising a child, an infant, or a pet in the vehicle;
    a horn;
    hazard lights; and
    a computing system comprising a processor and a memory coupled to processor, the memory storing software that when executed on the processor is configured to:
    determine a risk level based on temperature information detected the temperature sensor;
    control the second sensor based on the determined risk level;
    detect the object based on the information detected by the second sensor;
    output an alarm signal according to a set alarm condition when the object in the vehicle is detected, the alarm signal being output to the horn, the hazard lights, or a communication device; and set a sensor operating condition and an alarm condition based the determined risk level based on an imported table, the table defining sensor detection frequencies, sensor detection periods and alarm time for risk levels, respectively.

17. The vehicle of claim 16, wherein the temperature information includes indoor temperature information.

18. The vehicle of claim 17, wherein the temperature information further includes outdoor temperature information.

19. The vehicle of claim 16, wherein the risk level is determined by calculating a risk score based on the temperature information of the vehicle and determining the risk level corresponding to the calculated risk score.

20. The vehicle of claim 16, wherein the risk level is determined by calculating a risk score by calculating an indoor temperature score and an illuminance score using indoor temperature information and illuminance information, and calculating the risk score from an absolute value of the sum of the indoor temperature score and the illuminance score calculated.

* * * * *